US009699392B2

(12) United States Patent
Way

(10) Patent No.: US 9,699,392 B2
(45) Date of Patent: Jul. 4, 2017

(54) IMAGING SYSTEM FOR AN AIRCRAFT

(71) Applicant: FLIR Systems, Inc., Wilsonville, OR (US)

(72) Inventor: Scott P. Way, West Linn, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 177 days.

(21) Appl. No.: 14/550,827

(22) Filed: Nov. 21, 2014

(65) Prior Publication Data

US 2016/0144977 A1 May 26, 2016

(51) Int. Cl.
*H04N 7/00* (2011.01)
*H04N 5/33* (2006.01)
*H04N 5/232* (2006.01)
*H04N 5/225* (2006.01)

(52) U.S. Cl.
CPC ............. *H04N 5/33* (2013.01); *H04N 5/2258* (2013.01); *H04N 5/2259* (2013.01); *H04N 5/23238* (2013.01); *H04N 5/23267* (2013.01)

(58) Field of Classification Search
CPC ............. H04N 5/23238; H04N 5/2259; H04N 5/23267; H04N 5/2258; H04N 5/33
USPC .......................................................... 348/38
See application file for complete search history.

(56) References Cited

U.S. PATENT DOCUMENTS

| | | | | |
|---|---|---|---|---|
| 8,373,127 B2* | 2/2013 | Ragucci | ............... | G01S 19/14 250/346 |
| 8,903,568 B1* | 12/2014 | Wang | ................... | B64C 19/00 244/189 |
| 2011/0164863 A1* | 7/2011 | Hayashi | ............ | G02B 27/646 396/55 |
| 2012/0147133 A1* | 6/2012 | Hadwiger | ........ | H04N 5/23238 348/36 |
| 2013/0210563 A1* | 8/2013 | Hollinger | .......... | H04N 5/2252 473/570 |
| 2015/0109468 A1* | 4/2015 | Laroia | ................. | G02B 13/02 348/208.6 |
| 2015/0138309 A1* | 5/2015 | Seok | ................. | H04N 5/23238 348/36 |

* cited by examiner

*Primary Examiner* — William Tran
(74) *Attorney, Agent, or Firm* — Haynes and Boone, LLP

(57) ABSTRACT

Aircraft imaging system, including apparatus and methods, with compensation for changes to an attitude of an aircraft. In some embodiments, the system may include an array of image detectors having fields of view that partially overlap to create a wider field of view collectively. The system also may include a processor programmed to (a) splice video images collected by the array of image detectors while the array remains mounted in a fixed relation to an aircraft having a varying attitude, to create a series of spliced frames representing the wider field of view over a time interval, and (b) select a frame portion of each spliced frame based at least in part on one or more signals from an attitude sensor carried by the aircraft such that the selected frame portions each represent a same angle of view with respect to horizontal.

20 Claims, 7 Drawing Sheets

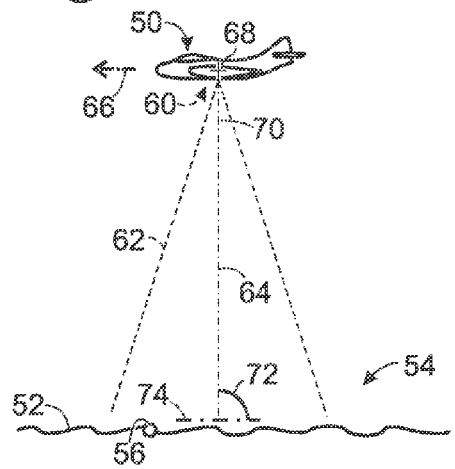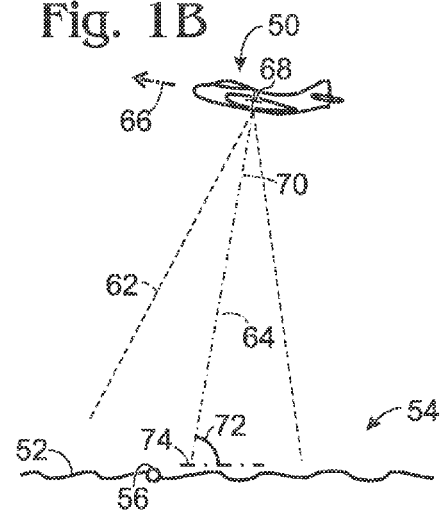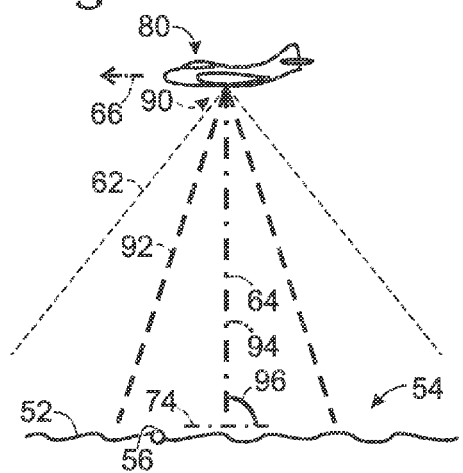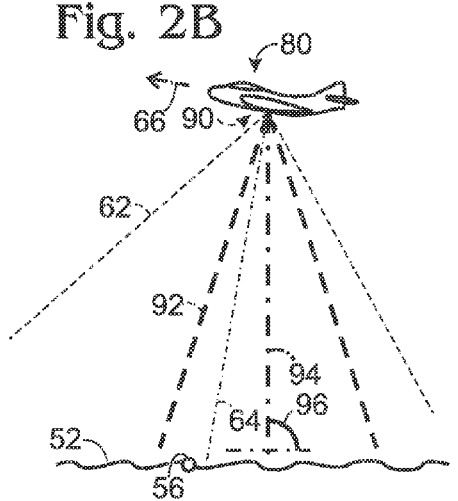

Fig. 3
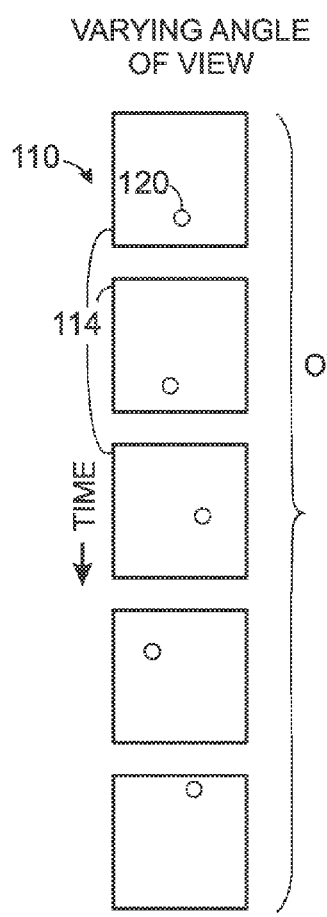
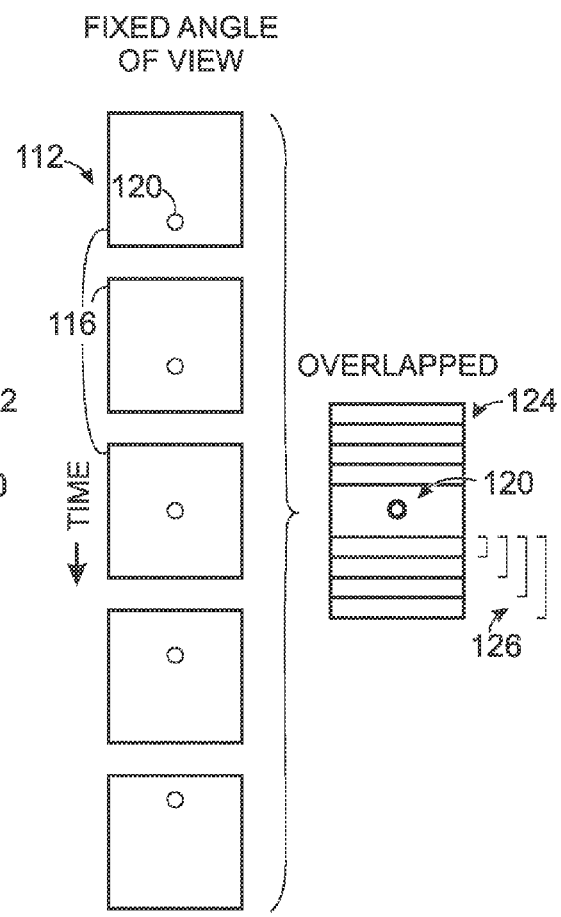

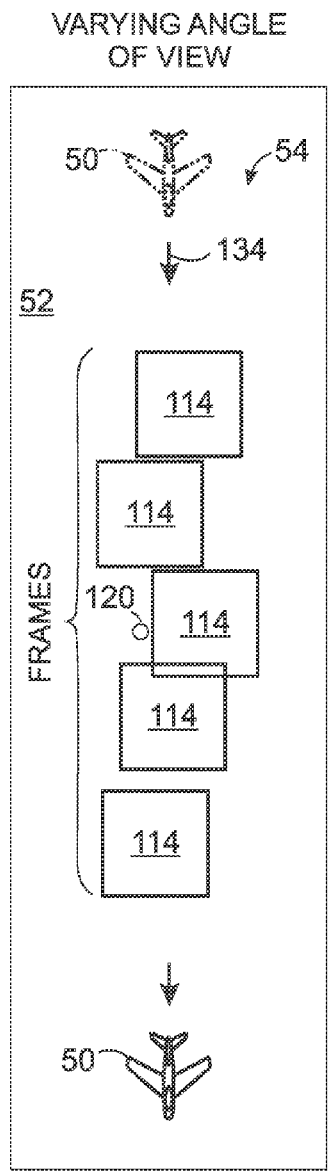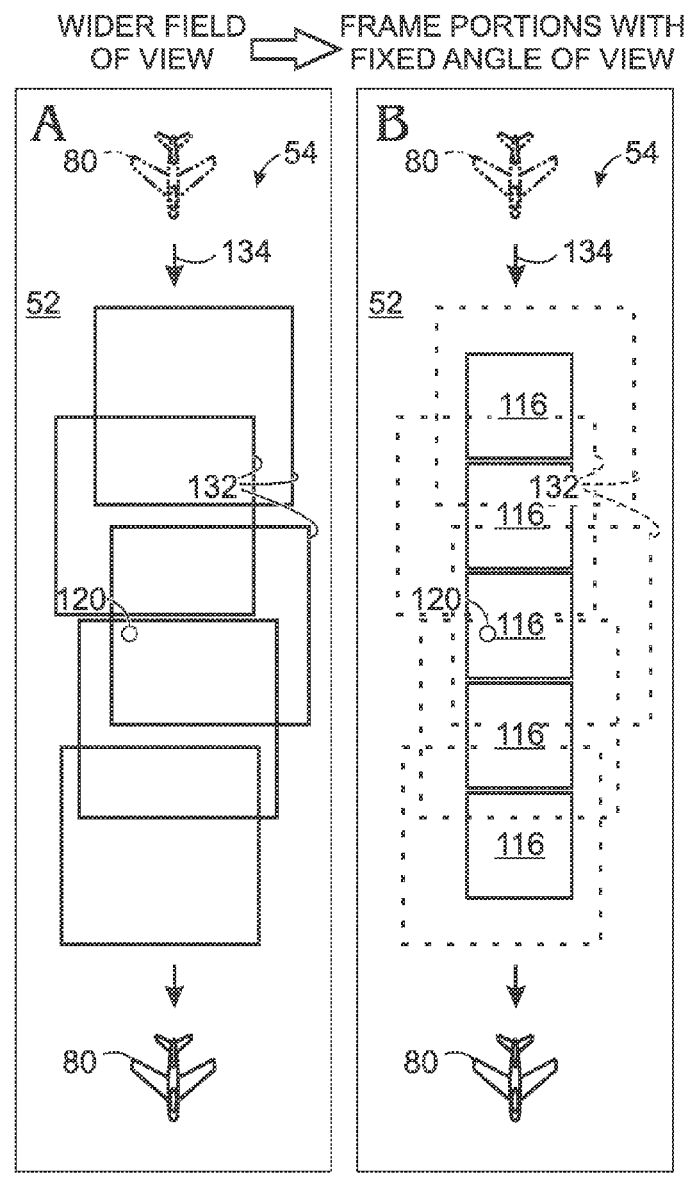

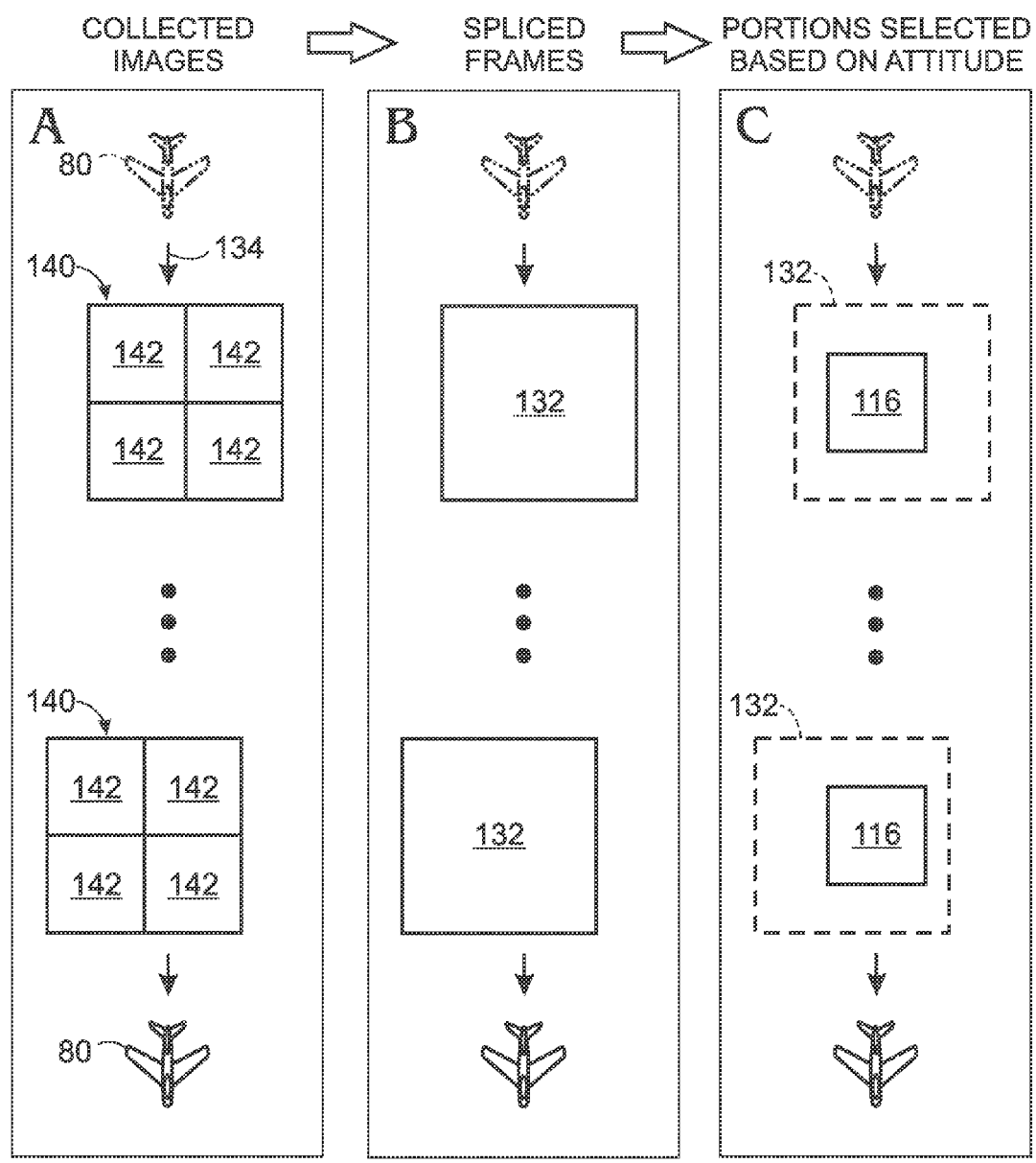

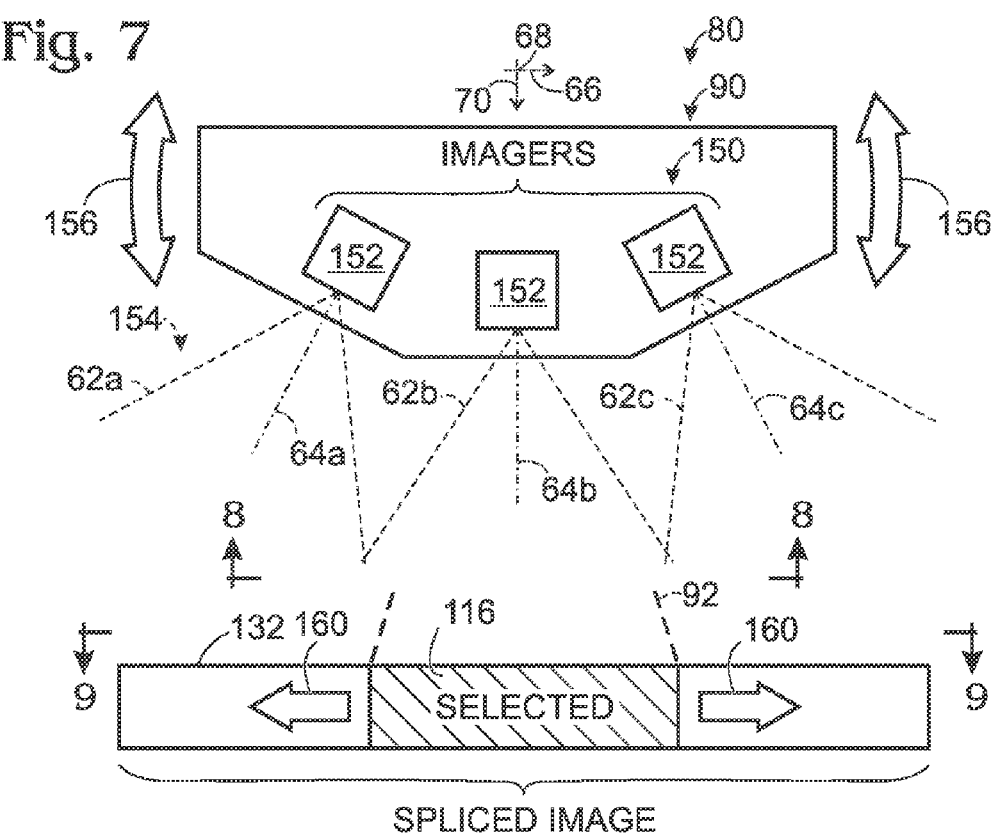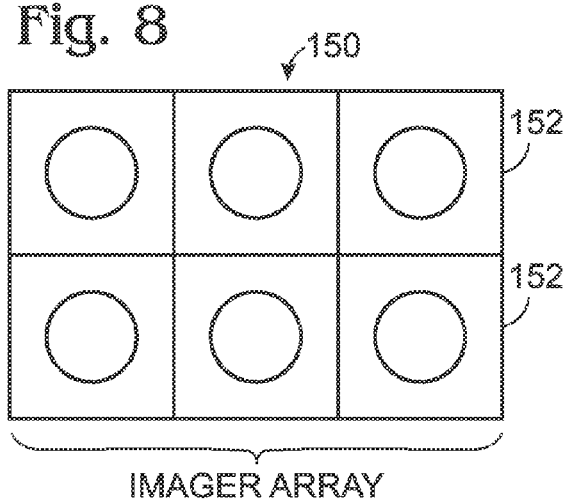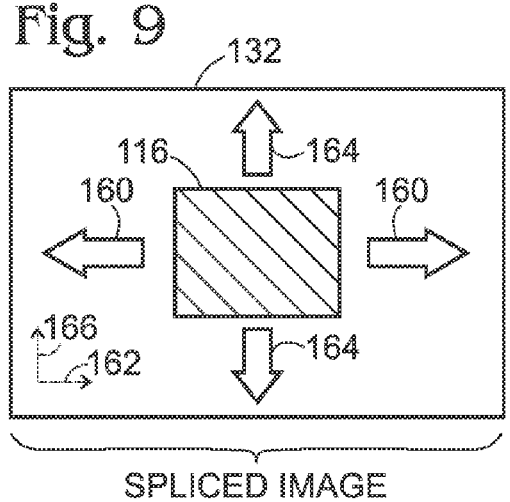

IMAGING SYSTEM FOR AN AIRCRAFT

Search and rescue operations may be conducted with an aircraft that flies over a search area to look for objects of interest, such as a person in the water. An onboard imaging system including an infrared video camera may be used to facilitate the search process, for example, to allow searching at night and/or to increase contrast between a person and the water.

The altitude at which the aircraft flies over the search area is a trade-off between the width of swath viewed by each pass over the search area and the detectability of objects of interest. If the aircraft flies at low altitude, the objects are easier to detect from video collected by the onboard imaging system, but the size of the search area may be too limited. Alternatively, if the aircraft flies at high altitude, a larger area can be searched but the objects may be difficult to detect reliably from the video.

New imaging systems are needed to improve the speed and efficiency of airborne searches, particularly over a featureless search area, such as over water.

SUMMARY

The present disclosure provides an aircraft imaging system, including apparatus and methods, with compensation for changes to an attitude of an aircraft. In some embodiments, the system may include an array of image detectors having fields of view that partially overlap to create a wider field of view collectively. The system also may include a processor programmed to (a) splice video images collected by the array of image detectors while the array remains mounted in a fixed relation to an aircraft having a varying attitude, to create a series of spliced frames representing the wider field of view over a time interval, and (b) select a frame portion of each spliced frame based at least in part on one or more signals from an attitude sensor carried by the aircraft such that the selected frame portions each represent a same angle of view with respect to horizontal.

BRIEF DESCRIPTION OF THE DRAWINGS

FIGS. 1A and 1B are side views of an aircraft flying over water and collecting images of a search area containing an object of interest, with the aircraft oriented at two different pitches and including a fixed imaging system that cannot compensate for changes to the attitude (the orientation) of the aircraft, in accordance with aspects of the present disclosure.

FIGS. 2A and 2B are side views of another aircraft flying over water as in FIGS. 1A and 1B and including a fixed imaging system that compensates for changes to the attitude of the aircraft, in accordance with aspects of the present disclosure.

FIG. 3 is a schematic comparison of a series of video frames (panel A) or video frame portions (panel B) representing the same time interval and the same flight path over the search area of FIGS. 1A, 1B, 2A, and 2B, with the series being generated without (panel A) and with (panel B) attitude compensation, and with the frames/frame portions of each series shown spaced from one another and also shown partially overlapped with one another and in alignment with a travel axis of the aircraft but offset from one another along the travel axis to account for forward motion of the aircraft, in accordance with aspects of the present disclosure.

FIG. 4 is a schematic series of video frames created by the imaging system of FIG. 1 as the imaging system is carried by an aircraft on a flight path over the search area of FIG. 1A, with each frame positioned within the search area to indicate a field of view within the search area represented by the frame.

FIG. 5 is a schematic series of video frames (panel A) and selected frame portions (panel B) created by the imaging system of FIG. 2, with the video frames collected over the same flight path as FIG. 4 and with the same variations in the attitude of the aircraft, in accordance with aspects of the present disclosure.

FIG. 6 is a series of panels showing corresponding sets of video images (panel A), spliced frames (panel B), and selected frame portions (panel C) created by the imaging system of FIG. 2 when the imaging system is carried on the flight path shown in FIG. 5, in accordance with aspects of the present disclosure.

FIG. 7 is a schematic side view of an exemplary array of image detectors for the imaging system of FIG. 2, and a spliced image formed from a set of overlapping images collected at the same time by the image detectors, with a portion of the spliced image selected for further processing based on the attitude of an aircraft carrying the array, in accordance with aspects of the present disclosure.

FIG. 8 is a bottom view of the array of FIG. 7, taken generally along line 8-8 of FIG. 7.

FIG. 9 is a top view of the spliced image of FIG. 7.

DETAILED DESCRIPTION

Figure 10:
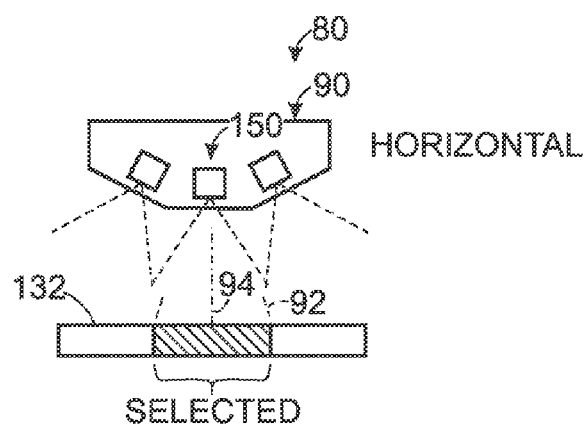
FIGS. 10-13 are schematic side views of the array of image detectors and the spliced image of FIG. 7, taken with the array (and a supporting aircraft) at different attitudes, and showing how the selected portion of the spliced image changes with each attitude.
Figure 11:
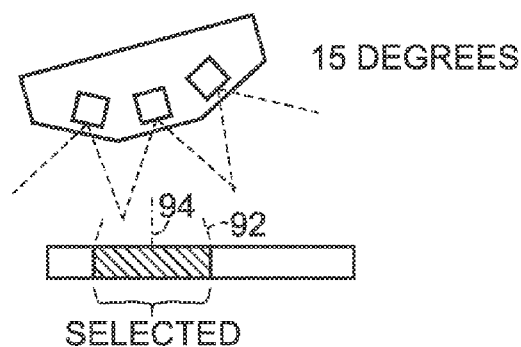
Figure 12:
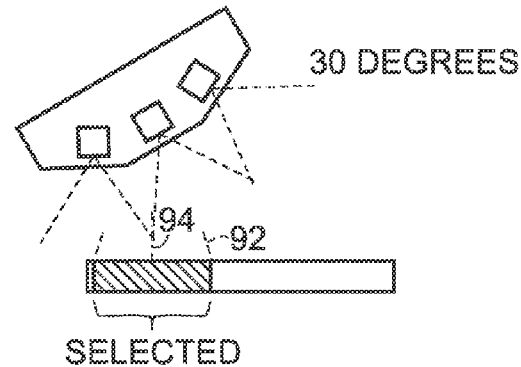
Figure 13:
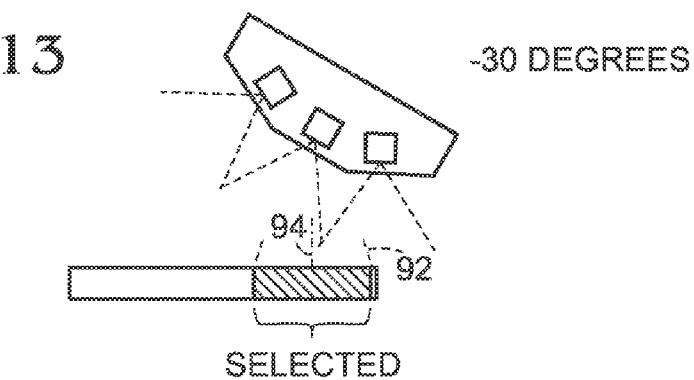

The present disclosure provides an aircraft imaging system, including apparatus and methods, with compensation for changes to an attitude of an aircraft. In some embodiments, the system may include an array of image detectors having fields of view that partially overlap to create a wider field of view collectively. The system also may include a processor programmed to (a) splice video images collected by the array of image detectors while the array remains mounted in a fixed relation to an aircraft having a varying attitude, to create a series of spliced frames representing the wider field of view over a time interval, and (b) select a frame portion of each spliced frame based at least in part on one or more signals from an attitude sensor carried by the aircraft such that the selected frame portions each represent a same angle of view with respect to horizontal.

Search and rescue operators, such as members of the coast guard, military, or law enforcement, have a need for a wide field of view (FOV) imager that detects persons or other objects of interest in the water, and automatically cues a narrow FOV imager. It would be advantageous to have the wide FOV imager pointed straight down or at some other constant angle with respect to horizontal, regardless of the attitude of an aircraft-based platform. This usually requires a mechanical gimbal system to steer the wide FOV imager to compensate for platform motion. However, if the wide and narrow FOV imagers are both steered by the same gimbal system, they cannot be aimed independently at the same time. The present disclosure provides a system that may use an array of imagers to produce very wide FOV images. A portion of each image may be selected based on signals from an attitude sensor (also called an attitude reference sensor). The very wide FOV images can be very wide in both the x and y dimensions, and a portion of each image can be selected with respect to both the x and y dimensions. The selected portions can be processed for target detection or display, among others.

Additional aspects of the present disclosure are described in the following sections: (I) definitions, (II) overview of attitude compensation, (III) array of image detectors, and (IV) exemplary imaging system.

I. Definitions

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context.

Optical radiation—Electromagnetic radiation of one or more wavelength ranges lying between about 1 nm and about 1 mm. Optical radiation may include any combination of ultraviolet, visible, and infrared radiation.

Ultraviolet radiation—Optical radiation invisible to the human eye and having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible light—Optical radiation visible to the normal human eye and having wavelengths from about 360 or 400 nanometers, just longer than ultraviolet radiation, to about 760 or 800 nanometers, just shorter than infrared radiation. Visible light typically may be imaged and detected by the unaided human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) radiation—Optical radiation invisible to the human eye and having wavelengths from about 700 or 800 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared having wavelengths between about 3,000 and 5,000 nm (i.e., between about 3 and 5 μm) and between about 8,000 and 12,000 nm (i.e., between about 8 and 12 μm) may be especially useful in thermal imaging, because they correspond to minima in atmospheric absorption and thus are more easily detected (particularly at a distance). The particular interest in relatively shorter wavelength IR has led to the following classifications: (A) near infrared (NIR) (from about 780 nm to about 1,000 nm (1 μm)), (B) short-wave infrared (SWIR) (from about 1,000 nm (1 μm) to about 3,000 nm (3 μm)), (C) mid-wave infrared (MWIR) (from about 3,000 nm (3 μm) to about 8,000 nm (8 μm), or about 3 μm to 8 μm), (D) long-wave infrared (LWIR) (from about 8,000 nm (8 μm) to about 15,000 nm (15 μm) or about 8 μm to 12 μm), and (E) very long-wave infrared (VLWIR) or far infrared (FIR) (from about 15,000 nm (15 μm) to about 1 mm). Portions of the infrared, particularly portions in the far or thermal IR having wavelengths between about 0.1 and 1 mm, may alternatively, or in addition, be termed millimeter-wave (MMV) wavelengths.

Image detector—An image sensor alone or in combination with input optics that transmit incident optical radiation to the image sensor. The image detector, interchangeably termed an imager, may be described according to the wavelength band that is detected, as determined by a combination of the spectral sensitivity of the image sensor and the spectral selectivity, if any, of the input optics. Each image detector may, for example, be a visible light image detector that predominantly or exclusively detects visible light, an ultraviolet image detector that predominantly or exclusively detects ultraviolet radiation, or an infrared image detector that predominantly or exclusively detects infrared radiation. If an infrared image detector, the detector may be a short-wave infrared detector that predominantly or exclusively detects SWIR, a mid-wave infrared detector that predominantly or exclusively detects MWIR, a long-wave infrared detector that predominantly or exclusively detects LWIR, or a combination thereof (e.g., an MWIR/LWIR image detector), among others. The image detector may be a thermal imager that detects infrared radiation, particularly infrared radiation of greater than about 1 μm.

Exemplary image detectors that may be suitable include (1) array detectors, such as charge-coupled devices (CODs), charge-injection devices (CIDs), complementary metal-oxide semiconductor (CMOS) arrays, photodiode arrays, microbolometers, and the like, and/or (2) an array of point detectors, such as photomultiplier tubes (PMTs), photodiodes, pin photodiodes, avalanche photodiodes, photocells, phototubes, and the like. Image detectors may be sensitive to the intensity, wavelength, polarization, and/or coherence of the detected radiation, among other properties, as well as spatial and/or temporal variations thereof.

Image—A representation of the spatial variation of electromagnetic radiation detected from a field of view. The representation may be in the form of data (e.g., a stored digital image) or optical radiation (e.g., a displayed visible image), among others. An image may, for example, be a video frame, a selected portion of a video frame, or a combination of two or more collected images (e.g., a spliced frame), among others.

II. Overview of Attitude Compensation

This section describes exemplary approaches to collecting and processing video images to achieve attitude compensation and identify targets for further imaging; see FIGS. 1-6.

FIGS. 1A and 1B are side views of an aircraft 50 flying over water 52 that provides a search area 54 containing an object of interest 56, such as a person in the water. Aircraft 50 is equipped with a prior art imaging system 60 for collecting video images as the aircraft flies over the search area. Imaging system 60 lacks the ability to compensate for changes to the orientation (the attitude) of the aircraft.

The aircraft may be any airborne platform. The platform may be a crewed or unmanned aerial vehicle, which may or may not be a fixed-wing aircraft. The aircraft may be powered (e.g., a jet aircraft, propeller-driven aircraft, rotorcraft, etc.) or unpowered (e.g., a balloon, dirigible, glider, kite, etc.), among others.

Imaging system 60 has a field of view 62 centered on an optical axis 64 that is fixed with respect to aircraft 50 and an aircraft-defined axis system. The aircraft-defined axis system has a roll axis 66 (an X axis or travel axis), a pitch axis

68 (a Y axis or lateral axis), and a yaw axis 70 (a Z axis or vertical axis). (Yaw axis 70 may or may not be parallel to and/or with coaxial with optical axis 64.) The orientation (interchangeably termed the attitude) of aircraft 50 (and thus the aircraft-defined axis system) can be described by rotation about each of axes 66, 68, and 70, with an earth-defined axis system (e.g., North-East-Down) as a reference frame. (The orientation of the aircraft about roll axis 66 (the side-to-side tilt), pitch axis 68 (the fore and aft tilt), and yaw axis 70 (the aircraft's heading), respectively, is called the aircraft's roll, pitch, and yaw.) Aspects of the aircraft's orientation, such as its pitch and roll, can vary continually as a result of changes in air pressure, wind/turbulence, pilot maneuvers, and the like. Accordingly, an angle of view 72 (also called a viewing angle) defined by optical axis 64 with respect to a local (tangential) horizontal plane 74 of the earth-defined axis system is not fixed, but instead varies according to the pitch and the roll of the aircraft. The term "horizontal" means normal to the direction of gravity.

Angle of view 72 may be a minimum angle formed between optical axis 64 and plane 74. Alternatively, angle of view 72 may be defined by a pair of angles, namely, a first angle defined between optical axis 64 and plane 74 in a roll-yaw plane (defined by roll axis 66 and yaw axis 70), and a second angle defined between optical axis 64 and plane 74 in a pitch-yaw plane (defined by pitch axis 68 and yaw axis 70).

In the present illustration, optical axis 64 is parallel to yaw axis 70 of the aircraft. However, the optical axis may be fixed at any suitable angle with respect to the yaw axis, such as extending forward or rearward of the yaw axis (in the roll-yaw plane) and/or laterally of the yaw axis (in the pitch-yaw plane), or a combination thereof, among others.

Imaging system 60 has a viewing angle 72 of ninety degrees in FIG. 1A, as measured in the roll-yaw plane and the pitch-yaw plane. Optical axis 64 is normal to horizontal plane 74. The aircraft is in a perfectly "horizontal" configuration (no fore-aft tilt or side-to-side tilt), with the pitch and the roll of the aircraft each being zero degrees. Stated differently, optical axis 64 is normal to horizontal plane 74, and roll axis 66 and pitch axis 68 are each parallel to horizontal plane 74. However, changes to the pitch and the roll of the aircraft, can change viewing angle 72. For example, if the nose of aircraft 50 is tilted upward with respect to horizontal plane 74 by ten degrees, as in FIG. 1B, to change the pitch (also called the pitch angle) of the aircraft, optical axis 64 is reoriented by the same angle value, to produce a viewing angle 72 of eighty degrees in the roll-yaw plane. Also or alternatively, if the roll (also called the roll angle) of the aircraft about its roll axis is changed, the optical axis again is reoriented accordingly.

FIGS. 2A and 2B are side views of another aircraft 80 flying over water 52 as in FIGS. 1A and 1B. Aircraft 80 includes a fixed imaging system 90 that compensates for changes to the attitude of the aircraft, such as changes to the aircraft's pitch and roll, and, optionally, changes to the aircraft's yaw. Imaging system 90 may have any combination of the features described above for imaging system 60. For example, imaging system 90 may have a field of view 62 defining an optical axis 64 that is fixed with respect to aircraft 80. However, field of view 62 for imaging system 90 may be wider than that of imaging system 60 (compare FIGS. 1A and 2A), to permit attitude compensation by image processing without reducing the field of view to a size narrower than that of system 60.

Imaging system 90 may be programmed to electronically select an image portion from a collected image. This process is illustrated schematically with heavier lines in FIGS. 2A and 2B (also compare with FIGS. 1A and 1B). The selected image portion may represent a reduced field of view 92 within full field of view 62. The reduced field of view may be centered on a selected optical axis 94 that is fixed with respect to horizontal plane 74, thereby representing a fixed viewing angle 96 as the pitch and/or roll of the aircraft changes. For example, the viewing angle may remain normal to horizontal plane 74 with changes to the aircraft's pitch/roll (compare FIGS. 2A and 2B). Selected optical axis 94 may form a fixed minimum angle with horizontal plane 74 and/or a fixed angle with plane 74 in a roll-yaw plane and/or pitch-yaw plane.

FIG. 3 shows a schematic comparison of two corresponding series 110, 112 of images, namely, video frames 114 (also called video images) or frame portions 116 (also called image portions), representing a varying angle of view (panel A) or a fixed angle of view (panel B). Each series 110 or 112 represents a same time interval and a same flight path over search area 54 and object 56 of FIGS. 1A/1B and 2A/2B. Series 110 may be collected by imaging system 60 of aircraft 50 (see FIGS. 1A and 1B) without attitude compensation. Series 112 may be created by imaging system 90 of aircraft 80 (see FIGS. 2A and 2B) and results from selecting image portions to compensate for changes to the aircraft's attitude. Object 56 of FIGS. 1A/1B and 2A/2B is shown in each frame or frame portion as a target or feature 120. Target 120 may be difficult or impossible to detect reliably in the data of any single frame or frame portion due to low contrast, particularly when object 56 is small and/or the aircraft is flying high above the search area.

Target 120 appears to move in successive frames or frame portions within each series of FIG. 3 due to movement of the aircraft, which generally includes forward travel along the flight path and changes in attitude caused by a varying pitch and roll. However, the apparent movement of the target over time is much more erratic when the viewing angle varies (panel A) compared to a fixed viewing angle (panel B). The fixed viewing angle of panel B is created by compensating for changes in the aircraft's attitude, as described more fully below.

The series of frames or frame portions in FIGS. 3A and 3B may be processed to create overlapped data sets 122, 124. Each data set may be created by processing pixel data, such as by summing and/or averaging, or otherwise correlating and/or combining pixel values from different frames/frame portions. The frames/frame portions may be overlapped in alignment with a travel axis (the roll axis) of the aircraft but offset from one another along the travel axis to account for forward motion of the aircraft over a time interval during which the frames/frame portions are collected. In some cases, the pixel values of frames/frame portions may be summed and/or averaged in a line-by-line fashion, with a line offset 126 proportional to the time difference between frames/frame portions. A suitable line offset may be determined at least in part by the aircraft's speed and/or altitude, and/or the frame rate at which images are collected, among others. In any event, without compensating for changes in attitude, pixels for the target can shift erratically in position from frame to frame and are poorly aligned by offset 126 (see panel A). In contrast, compensation for changes in attitude results in less erratic positioning of target pixels from frame portion to frame portion (see panel B), such that the target pixels from different frame portions are more accurately aligned with one another. As a result, the target can be more efficiently and reliably detected in overlapped data set 124 (compare overlapped data sets 122, 124 of panels A and B). Accordingly, the imaging system of the present disclosure may save lives and reduce the time and cost of aerial searching.

FIGS. 4 and 5 show a schematic comparison of approaches to creating video frames 114 or frame portions 116 with aircrafts 50 and 80, respectively (also see FIGS. 1A, 1B, 2A, and 2B). FIG. 4 shows video frames 114 without attitude compensation. FIG. 5 shows an exemplary approach to creating frame portions 116 from spliced video frames 132 with attitude compensation. In FIGS. 4 and 5A, corresponding narrower frames 114 and wider spliced frames 132 of each frame series represent the same (varying) angle of view, but respective narrower and wider fields of view, as aircraft 50 or 80 flies on the same path over search area 54. Each frame 114 or 132 is positioned within the search area according to the particular field of view represented by the frame. To simplify the presentation, only a small subset of the chronologically-ordered frames within each frame series is shown (e.g., only one out of every one-hundred consecutive frames). As the pitch and roll of the aircraft changes, the fields of view represented by the frames shift from side to side in FIGS. 4 and 5A, and the spacing between the fields changes. The frames also may pivot relative to one another (not shown) due to changes in the yaw of the aircraft. Attitude compensation may or may not correct for changes in the yaw.

In some embodiments, video images do not need to be spliced. For example, video frames may be collected by a single image detector rather than an array of image detectors having overlapping fields of view. The single image detector may have a field of view that is sufficiently wide, particularly if the aircraft is flying at a low altitude above the search area.

FIG. 5B shows how a frame portion 116 of each spliced frame 132 can be selected to compensate for changes in the attitude of the aircraft. Each frame portion represents a selected field of view that is narrower that than full field of view represented by each of the spliced frames. The frame portions represent a fixed angle of view with respect to horizontal in the roll-yaw plane and the pitch-yaw plane. Accordingly, the selected fields of view in FIG. 5B are aligned with one another along the aircraft's travel path 134, and may have a uniform offset if the aircraft's speed and altitude remain constant.

FIG. 6 schematically shows how overlapping sets 140 of video images 142 collected by an array of image detectors (panel A) can be spliced together to create spliced frames 132 (panel B) from which frame portions 116 can be selected (panel C) (also see FIGS. 5A and 5B). Each video image 142, spliced frame 132, and frame portion 116 is positioned within search area 54 as in FIGS. 5A and 5B, but only the first and last sets 140, first and last spliced frames 132, and first and last frame portions 116 of a consecutive series is shown, to simplify the presentation.

Each video image 142 of an overlapping set 140 may be collected at substantially the same time by a different image detector of any array of image detectors. The image detectors may have narrower fields of view that partially overlap to create an overlapping set 140 having a wider field of view when combined. For example, here, the array is a two-by-two array of image detectors, to generate a set of four overlapping video images 142, which may be spliced together to create a spliced video frame 132. However, in other embodiments, the array may be an N by M array, where each of N and M independently is one, at least two, or more than two.

III. Array of Image Detectors

This section describes an exemplary array of image detectors, and attitude compensation achieved by selecting frame portions of spliced video frames created from video images collected by the array; see FIGS. 7-13.

FIG. 7 is a schematic side view of an exemplary array 150 of image detectors 152 for imaging system 90, viewed parallel to pitch axis 68 of aircraft 80, and a spliced image 132 created from a set of images collected at substantially the same time by the array of image detectors. The image detectors may have partially overlapping fields of view (such as fields 62a, 62b, and 62c) defining corresponding angularly offset optical axes (such as optical axes 64a, 64b, and 64c). An overlapping set of video images (see FIG. 6) collected at substantially the same time by the image detectors may be spliced together electronically to form spliced video frame 132 representing a wider, combined field of view 154 than any of the original fields of view (such as 62a, 62b, and 62c) individually. Array 150 may be mounted in a fixed relation to aircraft 80, such that changes to the attitude of aircraft 80, indicated by arrows at 156, and changes to the orientation of the array, are coupled to one another.

The array of image detectors may functionally replace a gimbal-mounted image detector having a mechanically aimable optical axis for wide-field searching of an area by aircraft. The array may have a combined field of view 154 that includes a desired field of view 92 (having a fixed viewing angle with respect to horizontal), plus any expected platform (aircraft) motion. For example, if the desired field of view is ninety degrees and platform motion 156 is forty-five degrees in each pivotal direction, then the combined field of view of the array should be about 180 degrees (i.e., 90+45+45 degrees). In other embodiments, the combined field of view may be greater than about 60, 90, 120, or 150 degrees, among others. Combined field of view 154 may be created by an array of image detectors to provide sufficient resolution for desired field of view 92. The images may be electronically stitched together to provide a combined field of view that is seamless. A frame portion 116 may be selected from spliced frame 132, to select desired field of view 92 from combined field of view 154. Frame portion 116 corresponding to desired field of view 92 is variably positionable within spliced frame 132 by "electronic panning," indicated by motion arrows at 160, to compensate for aircraft motion 156 that changes the pitch of the aircraft.

FIG. 8 shows a bottom view of array 150 of image detectors 152. The optical axes of image detectors 152 may be angularly offset from one another in one or more planes. If there is only one line of image detectors, the optical axes may be angularly offset from one another in only one plane, such as in a plane parallel to the pitch-yaw plane (e.g., for a line arranged at least generally parallel to the pitch axis) or in a plane parallel to the roll-yaw plane (e.g., for a line arranged at least generally parallel to the roll axis). If there are two or more rows of image detectors, as in FIG. 8, the optical axes may be angularly offset from another in each of a pair of orthogonal planes, such as in plane parallel to the pitch-yaw plane and in a plane parallel to the roll-yaw plane.

FIG. 9 schematically shows how a selected frame portion 116 can be variably positioned within a spliced frame 132. Changes to the pitch of the aircraft cause the position of the selected frame portion to change, indicated by arrows at 160, along a first image axis 162 corresponding generally to roll axis 66 (see FIG. 7). Changes to the roll of an aircraft cause the position of the selected frame portion to change, indicated by arrows at 164, along a second image axis 166 corresponding generally to pitch axis 68. The size of the frame portion (e.g., in pixels) selected from each frame may remain constant. In some embodiments, the frame portion selected may be pivoted with respect to image axes 162, 166, to compensate for changes to the yaw of the aircraft.

FIGS. 10-13 schematically show how the selected portion of a spliced image 132 changes with the pitch of aircraft 80 (also see FIGS. 7 and 9). The magnitude of the pitch (e.g., 0, 15, or 30 degrees) and the direction of the pitch (e.g., clockwise or counterclockwise in this view) may determine the direction and magnitude of the offset of the selected portion from a central or neutral position (compare FIG. 10 with each of FIGS. 11-13). The selected portion may change similarly with changes to the roll of the aircraft along an orthogonal image axis (see FIG. 9).

IV. Exemplary Imaging System

Figure 14:
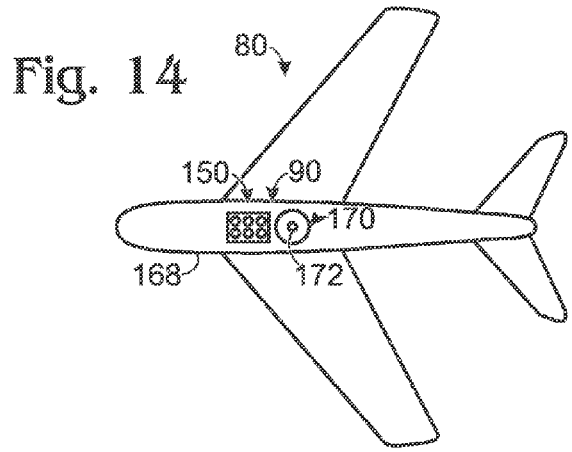
FIG. 14 is a bottom view of an aircraft equipped with an exemplary imaging system having attitude compensation, in accordance with aspects of the present disclosure.
Figure 15:
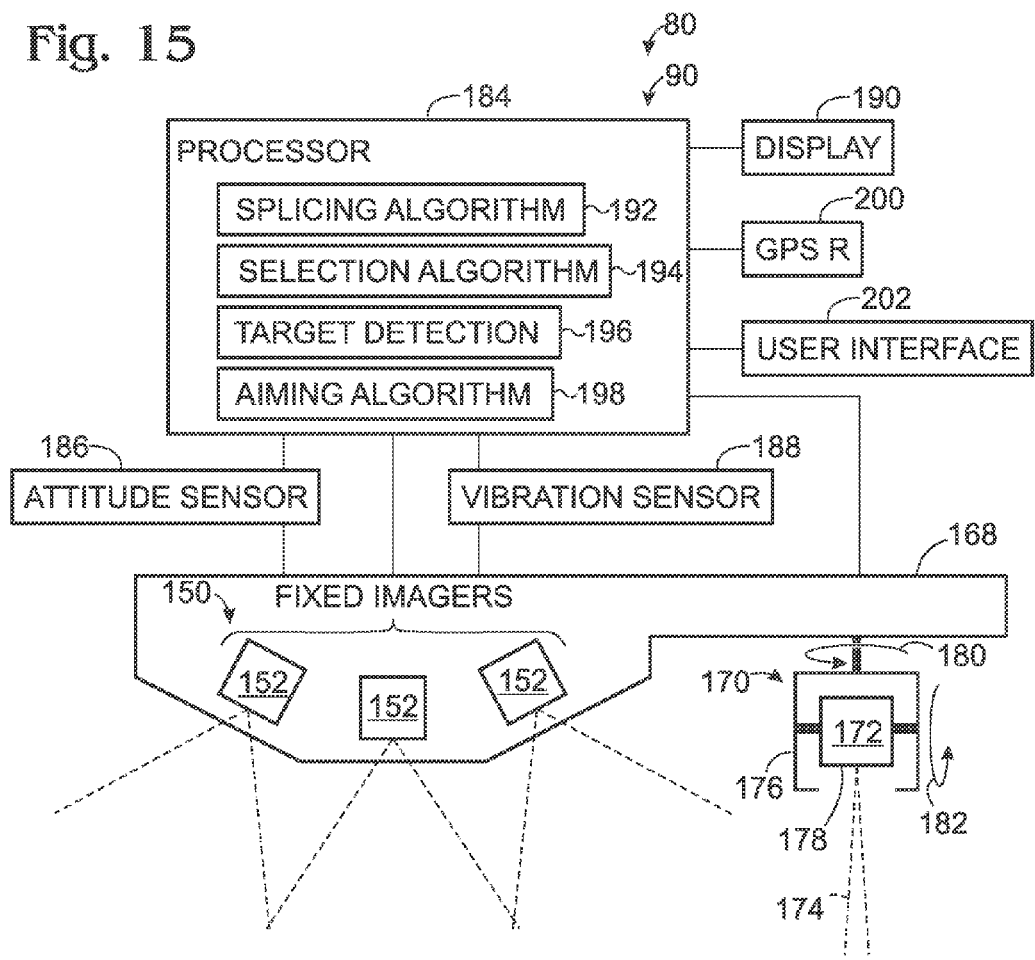
FIG. 15 is a schematic view of selected aspects of the imaging system and aircraft of FIG. 14.

This section describes an exemplary imaging system 90 with attitude and vibration compensation; see FIGS. 14 and 15.

FIG. 14 shows a bottom view of an aircraft 80 equipped with imaging system 90. An array 150 of image detectors may be mounted to a bottom side of the aircraft's body 168, such as to the fuselage. A gimbal system 170 including a pivotable image detector 172 also may be mounted (e.g., separately) to the bottom side of the aircraft.

FIG. 15 shows a schematic view of imaging system 90. Array 150 of image detectors 152 may be fixed with respect to aircraft body 168, while pivotable image detector 172 is pivotable with respect to body 168 and array 150. Accordingly, pivotable image detector 172 can be aimed independently of array 150. Pivotable image detector 172 thus can be used to visualize and screen targets previously imaged by array 150, for target validation, while the array continues to collect video data for additional target detection. The pivotable image detector may have a narrow field of view 174. The size of field of view 174 may be substantially smaller than the collective field of view of array 150, such as less than about 20%, 10%, or 5%, among others, of the field of view, as measured by area. The size of field of view 174 also may be smaller than the field of view of each individual image detector 152, such as less than about 50%, 25%, or 10%, among others, of the field of view, as measured by area, to provide a higher magnification and/or higher resolution view of each target.

Pivotable image detector 172 may be gimbal-mounted to the aircraft via at least a pair of gimbals 176, 178. The gimbals may be motor-driven to control rotation of the gimbals about a pair of respective orthogonal axes, indicated by rotation arrows at 180, 182. Controlled rotation of the gimbals allows the pivotable image detector to pan and tilt, for aiming at a series of targets detected in collected image data by the imaging system.

Imaging system 90 may include a processor 184, which may be in communication with any combination of array 150, gimbal system 170 and/or pivotable image detector 172, an attitude sensor 186, a vibration sensor 188, and a display 190. The processor may include various algorithms to process image data from image detectors 152. The algorithms may include a splicing algorithm 192 that electronically splices video images from devices 152 to create spliced frames. The processor also may include a selection algorithm 194 that selects a frame portion from each spliced frame based on one or more signals from attitude sensor 186, and, optionally, one or more signals from vibration sensor 188. The processor further may include a target detection algorithm 196 that processes data from selected frame portions to detect targets in image data. The processor even further may include an aiming algorithm 198 that causes pivotable image detector 172 to be aimed at one or more targets detected in the image data by algorithm 196. The processor may be a single device or two or more devices that can communicate with one another.

Attitude sensor 186 may be any device or set of devices that can sense the orientation of the aircraft with respect to one or more axes, such as with respect to the pitch axis, the roll axis, and/or the yaw axis of the aircraft. An exemplary attitude sensor is an inertial measurement unit (IMU), which may include one or more gyroscopes to detect changes in the pitch, roll, and/or yaw of the aircraft. Any suitable signals from the attitude sensor may be used by processor 184 for selecting a frame portion from a frame. The signals may relate to any combination of the pitch, roll, and yaw of the aircraft.

Vibration sensor 188 may be any device or set of devices that can sense periodic and/or oscillatory motion of the image detectors. The vibration sensor may include at least one accelerometer, which may be a piezoelectric accelerometer. In some embodiments, the vibration sensor may include a first sensor to measure motion parallel to the roll axis and a second sensor to measure motion parallel to the pitch axis. Signals from the first sensor may be used to fine-tune the position of the selected frame portion along first image axis 162 (corresponding generally to roll axis 66), and signals from the second sensor may be used to fine-tune the position of the selected frame portion along second image axis 166 (corresponding generally to pitch axis 68) (see FIG. 9). In other words, signals from the attitude sensor may determine a relatively large positional shift in the selected frame portion from a central or neutral position within a frame, while signals from the vibration sensor may determine one or more additional small revisions to this position along one or more axes. However, signals from the attitude sensor and vibration sensor may be applied to the process of frame portion selection for a given frame in any suitable order or at the same time. Signals from the vibration sensor may help to stabilize and remove vibration-induced image blur from a series of selected frame portions.

Selected frame portions may be processed further. In some embodiments, one or more of the frame portions may be displayed to a user with display 190. In some embodiments, the frame portions may be processed for target detection by algorithm 196, to identify targets for further investigation, such as determining whether any of the detected targets in the image data visually match a physical object of interest (e.g., an object that is the goal of the search). Target detection generally includes combining, correlating, or otherwise collectively considering data from a series of selected frame portions, to identify image pixels or image sectors meeting one or more predefined criteria. Processing may occur on-site, while the aircraft is in flight, or may be performed remotely, either during the flight or at a later time. If processing is performed remotely, a different flight may investigate targets further. Further aspects of exemplary target detection based on images collected with a thermal imager are disclosed in U.S. Pat. No. 8,373,127, which is incorporated herein by reference.

Processor 184 may be programmed to aim pivotable image detector 172 at physical locations corresponding to detected targets, based on calculations performed by aiming algorithm 198. The algorithm may determine the physical location of each target in a suitable coordinate system, such as an earth-defined system. The physical location may be inferred based on the position of the target within one or more frames or corresponding frame portions, and the location of the aircraft in the coordinate system when the frames were collected. The location of the aircraft may be determined with a global positioning system (GPS) receiver 200 carried by the aircraft. Algorithm 198 then may calculate, based on the current location and orientation of the aircraft, how to orient pivotable image detector 172 with respect to the aircraft, such that detector 172 is aimed at the physical location for the target. For example, the algorithm may calculate a desired orientation of detector 172 with respect to a pair of orthogonal gimbal axes of gimbal system 170. The processor then may send signals to gimbal system 170 to cause pivotal motion of detector 172 until the desired orientation is reached. The processor also may continue to adjust the orientation of detector 172, as the location and orientation of the aircraft changes, to keep detector 172 aimed at the physical location corresponding to the target. Images, such as video images, collected by detector 172 may be presented to a user with display 190, or may be processed as image data, to, for example, validate or classify the target. Further aspects of aiming a gimbal-mounted image detector at a target are described in U.S. Patent Application Publication No. 2011/0304736 A1 and U.S. Pat. No. 8,373,127, which are incorporated herein by reference.

Imaging system 90 also may include a user interface 202 that allows a user to control any suitable aspects of the system. The user interface may permit the user to choose each detected target from a target cue, to control when detector 172 is aimed at the physical location for each target. The user interface also may allow the user to modify (e.g., fine-tune) the orientation of detector 172 (e.g., to scan an area around the physical location) and/or adjust the magnification of displayed images (e.g., adjusted optically and/or digitally).

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

I claim:

1. An imaging system for an aircraft, comprising:
an array of image detectors mounted in a fixed relation to an aircraft having fields of view that partially overlap to create a wider field of view collectively; and
a processor configured to:
splice a plurality of video images collected by the array of image detectors to generate a spliced frame comprising the wider field of view;
generate a series of the spliced frames from the plurality of video images collected over a time interval;
receive one or more aircraft orientation signals over the time interval from an attitude sensor coupled to the aircraft; and
select a frame portion from each of the series of spliced frames based at least in part on the one or more orientation signals such that the selected frame portions each comprise a same angle of view with respect to horizontal during the time interval.

2. The imaging system of claim 1, wherein the processor is programmed to detect targets in the frame portions.

3. The imaging system of claim 2, further comprising a pivotable image detector that is pivotable with respect to the array of image detectors, wherein the processor is programmed to cause the pivotable image detector to be aimed at a physical location corresponding to each of the targets.

4. The imaging system of claim 3, wherein the pivotable image detector is connected to a pair of gimbals that allow the pivotable image detector to be controllably pivoted about a pair of orthogonal axes.

5. The imaging system of claim 1, further comprising a display, wherein the processor is programmed to control presentation of the series of frame portions as visible images by the display.

6. The imaging system of claim 1, wherein the array of image detectors includes at least three image detectors, and wherein the aircraft orientation varies over the time interval.

7. The imaging system of claim 1, wherein each frame portion includes a set of pixel values, and wherein the processor is programmed to sum and/or average pixel values from different frame portions with one another.

8. The imaging system of claim 7, wherein the processor is programmed to sum and/or average pixel values from a first frame portion with pixel values from a second frame portion with an offset determined at least in part by a frame rate of the image detectors and a speed of the aircraft.

9. The imaging system of claim 1, further comprising a vibration sensor, wherein the processor is programmed to select a frame portion of each spliced frame based on one or more orientation signals from the attitude sensor and one or more vibration signals from the vibration sensor.

10. The imaging system of claim 1, wherein the processor includes a plurality of digital processing devices that are separate from one another.

11. An imaging system for an aircraft, comprising:
an array of image detectors mounted in a fixed relation to an aircraft having fields of view that partially overlap to create a wider field of view;
a pivotable image detector pivotable with respect to the array of image detectors about a pair of orthogonal axes; and
a processor configured to:
splice a plurality of video images collected by the array of image detectors to generate a spliced frame comprising the wider field of view;
generate a series of the spliced frames from the plurality of video images collected over a time interval;
receive one or more aircraft orientation signals over the time interval from an attitude sensor coupled to the aircraft;
select a frame portion from each of the series of spliced frames based on the one or more orientation signals, such that the selected frame portions each represent a same angle of view with respect to horizontal during the time intervals;
detect one or more targets, if any, from the frame portions; and cause the pivotable image detector to be aimed at a physical location corresponding to each target of the one or more detected targets.

12. A method of imaging from an aircraft, the method comprising:
- collecting a series of video images from each image detector of an array of image detectors over a time interval, the image detectors being mounted in a fixed relation to an aircraft and having fields of view that partially overlap to create a wider field of view collectively;
- monitoring an attitude of the aircraft;
- splicing video images collected by the array of image detectors to create a series of spliced frames comprising the wider field of view over the time interval; and
- selecting a frame portion of each spliced frame based at least in part on one or more orientation signals received from an attitude sensor coupled to the aircraft to detect an orientation of the aircraft such that the selected frame portions at least partially compensate for changes to the orientation of the aircraft over the time interval.

13. The method of claim 12, wherein the step of selecting a frame portion is performed such that the frame portions compensate for changes to a pitch and a roll of the aircraft during the time interval.

14. The method of claim 13, wherein the step of selecting a frame portion is performed such that the frame portions compensate for changes to a yaw of the aircraft during the time interval.

15. The method of claim 12, further comprising a step of detecting at least one target in the frame portions.

16. The method of claim 15, further comprising a step of pivoting a pivotable image detector with respect to the array of image detectors to aim the pivotable image detector at a physical location corresponding to the at least one target.

17. The method of claim 12, wherein the step of collecting is performed with an array of thermal imagers.

18. The method of claim 12, further comprising a step of forming one or more visible images representing at least part of one or more of the frame portions.

19. The method of claim 12, wherein each frame portion includes a set of pixel values, further comprising a step of summing and/or averaging one or more pixel values from a plurality of the frame portions with one another.

20. The method of claim 12, wherein the step of selecting a frame portion is also based in part on one or more signals from a vibration sensor.

* * * * *